US 10,794,468 B2

(12) United States Patent
Herrmann et al.

(10) Patent No.: US 10,794,468 B2
(45) Date of Patent: Oct. 6, 2020

(54) HYDRAULIC SYSTEM FOR A TRANSMISSION OF A MOTOR VEHICLE

(71) Applicant: ZF Friedrichshafen AG, Friedrichshafen (DE)

(72) Inventors: Markus Herrmann, Scheidegg (DE); Thilo Schmidt, Meckenbeuren (DE); Armin Haugg, Friedrichshafen (DE); Alexander Haberstock, Ravensburg (DE); Christian Popp, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/085,321

(22) PCT Filed: Feb. 17, 2017

(86) PCT No.: PCT/EP2017/053575
§ 371 (c)(1),
(2) Date: Sep. 14, 2018

(87) PCT Pub. No.: WO2017/157606
PCT Pub. Date: Sep. 21, 2017

(65) Prior Publication Data
US 2019/0093756 A1    Mar. 28, 2019

(30) Foreign Application Priority Data
Mar. 17, 2016   (DE) .................. 10 2016 204 399

(51) Int. Cl.
*F16H 57/04*    (2010.01)
*F16H 61/00*    (2006.01)
(Continued)

(52) U.S. Cl.
CPC .......... *F16H 57/0446* (2013.01); *F15B 11/17* (2013.01); *F16H 57/0435* (2013.01);
(Continued)

(58) Field of Classification Search
CPC ............. F16H 57/0439; F16H 57/0442; F16H 57/0447; F16H 57/0446; F15B 2211/20576
See application file for complete search history.

(56) References Cited

U.S. PATENT DOCUMENTS

| 7,951,043 B2 | 5/2011 | Reisch et al. |
| 2009/0082153 A1 | 3/2009 | Fujikawa et al. |

(Continued)

FOREIGN PATENT DOCUMENTS

| DE | 10318152 A1 | 11/2004 |
| DE | 102005013137 A1 | 9/2006 |

(Continued)

OTHER PUBLICATIONS

German Search Report DE102016204399.4 dated Nov. 23, 2016. (8 pages).

(Continued)

*Primary Examiner* — Thomas E Lazo
*Assistant Examiner* — Daniel S Collins
(74) *Attorney, Agent, or Firm* — Dority & Manning, P.A.

(57) ABSTRACT

A hydraulic system for a transmission of a motor vehicle, the system having first and second pumps for conveying hydraulic fluid into primary and/or system-pressure circuits so that an intended pressure prevails in the circuits. The system further including liquid retention means preventing a flow of hydraulic fluid conveyed by the second pump from being conducted through the first pump when the first pump is not conveying and the second pump is conveying, and preventing a flow of hydraulic fluid conveyed by the first pump from (Continued)

being conducted through the second pump when the second pump is not conveying and the first pump is conveying. The system additionally including a sailing-mode lubricating valve for controlling, by an open-loop system, a flow rate of hydraulic fluid conveyed by the second pump into the primary and/or secondary system-pressure circuits such that the intended pressure is set in the system-pressure circuits.

15 Claims, 2 Drawing Sheets

(51) Int. Cl.
  *G05D 16/04*  (2006.01)
  *F15B 11/17*  (2006.01)
  *G05D 7/03*  (2006.01)
  *G05D 7/06*  (2006.01)
  *G05D 16/16*  (2006.01)
  *F16H 59/18*  (2006.01)

(52) U.S. Cl.
  CPC ..... *F16H 57/0436* (2013.01); *F16H 61/0031* (2013.01); *G05D 7/03* (2013.01); *G05D 7/0682* (2013.01); *G05D 16/0404* (2019.01); *G05D 16/166* (2013.01); *F15B 2211/20515* (2013.01); *F15B 2211/20523* (2013.01); *F15B 2211/20546* (2013.01); *F15B 2211/20584* (2013.01); *F15B 2211/50536* (2013.01); *F15B 2211/526* (2013.01); *F15B 2211/6653* (2013.01); *F16H 2059/186* (2013.01); *F16H 2061/0037* (2013.01)

(56) References Cited

U.S. PATENT DOCUMENTS

2012/0055146 A1  3/2012 Baraga et al.
2016/0033031 A1  2/2016 Long et al.

FOREIGN PATENT DOCUMENTS

| DE | 102009002804 A1 | 11/2010 |
| DE | 102009019959 A1 | 11/2010 |
| DE | 102014207803 A1 | 10/2015 |
| JP | 2011163402 A | 8/2011 |

OTHER PUBLICATIONS

International Search Report (English Translation) PCT/EP2017/053575, dated May 12, 2017. (2 pages).

Fig. 1

HYDRAULIC SYSTEM FOR A TRANSMISSION OF A MOTOR VEHICLE

FIELD OF THE INVENTION

The invention relates generally to a hydraulic system for a transmission, in particular an automatic transmission, of a motor vehicle. The hydraulic system includes a dual pump system having a first pump, which is drivable by an internal combustion engine, and an electrically drivable second pump.

BACKGROUND

Dual pump systems of the aforementioned type are known and utilized, in particular, in automatic transmissions of motor vehicles and in transmissions of hybrid vehicles, wherein the first and the second pumps are utilized in combination to convey hydraulic oil within the transmission at intended pressures, for example, into a primary system-pressure circuit and into a secondary system-pressure circuit. The first pump is typically a sliding vane pump which is drivable by the internal combustion engine of the motor vehicle.

A sliding vane pump typically includes a stator, within which a rotor, which is eccentrically mounted with respect to the stator and drivable by the internal combustion engine, is rotatable. The rotor includes several radially extending slots which are distributed in the circumferential direction and in which vanes are radially displaceably arranged. If the rotor rotates, the vanes are pressed radially outward due to the resultant centrifugal forces and touch an inner wall of the stator, whereby a suctioning or a displacement of fluid is made possible. Sliding vane pumps are preferably utilized, due to their relatively high efficiency.

The second pump can be a pump having a variable as well as a constant volumetric flow rate, for example, another sliding vane pump. The second pump makes it possible to maintain an intended hydraulic pressure when the internal combustion engine is at a standstill and the first pump is not driven, for example, in a so-called "start-stop" mode or in a so-called "sailing" mode. In addition, the second pump can support the first pump at certain operating points, and so the first pump can possibly be proportioned smaller and/or operated more efficiently.

In known solutions, according to which the primary and the secondary system-pressure circuits are supplied with oil with the aid of the second pump, the problem can occur that the primary system pressure can only be adjusted with a high pressure control tolerance via a pressure-controlled second pump, which can negatively affect the clutch pressure control. A reduction of the pressure control tolerance can be accompanied by a correspondingly increased outlay—such as in the form of a pressure sensor—and, therefore, increasing costs. Moreover, there are times when a supply of the secondary system-pressure circuit is ensured only with an absolutely tight or leak-proof first pump in the form of a sliding vane pump. If this does not take place to a sufficient extent, the oil required for the secondary system-pressure circuit can escape via the sliding vane pump into the oil sump. One possible consequence thereof is that the transmission lubrication is undersupplied, which can result in permanent damage to the transmission.

The problem addressed by the present invention is that of providing a hydraulic system of the type mentioned at the outset, which does not require a leak tightness of the first pump and which makes it possible to carry out a closed-loop control of the second pump with low pressure tolerances.

SUMMARY OF THE INVENTION

The hydraulic system according to the invention for a transmission of a motor vehicle includes a first pump, which is drivable by an engine of the motor vehicle, and an electrically drivable second pump. The first pump and the second pump are both configured merely for conveying hydraulic fluid into a primary system-pressure circuit and a secondary system-pressure circuit of the hydraulic system, so that an intended pressure prevails in the primary system-pressure circuit and in the secondary system-pressure circuit. The hydraulic system further includes liquid retention means which are configured for preventing a flow of hydraulic fluid conveyed by the second pump from being conducted through the first pump when the first pump is not conveying and the second pump is conveying, or—in the opposite direction—for preventing a flow of hydraulic fluid conveyed by the first pump from being conducted through the second pump when the second pump is not conveying and the first pump is conveying. In addition, the hydraulic system includes a sailing-mode lubricating valve which is configured for controlling, by an open-loop system, a flow rate of hydraulic fluid conveyed by the second pump into the primary system-pressure circuit and into the secondary system-pressure circuit such that an intended pressure is set in the primary system-pressure circuit and in the secondary system-pressure circuit.

The first pump is drivable, in particular, by an internal combustion engine of the vehicle, while the second pump is electrically drivable. The two pumps are connectable to the first system-pressure circuit as well as to the second system-pressure circuit, and so hydraulic fluid, in particular oil, can be conveyed by the first pump and/or the second pump into the primary system-pressure circuit and/or into the secondary system-pressure circuit such that an intended pressure is set or established in the respective system pressure circuit.

The first pump can be a single pump. In conjunction with the present invention, the "first pump" is also to be understood to mean a pump system including two pumps which, together, are configured for conveying hydraulic fluid into the primary system-pressure circuit and into the secondary system-pressure circuit of the hydraulic system, and so an intended pressure prevails in the primary system-pressure circuit and in the secondary system-pressure circuit. The first pump is connectable, for example, via a system pressure valve, to the primary system-pressure circuit and to the secondary system-pressure circuit, wherein the system pressure valve can establish and prevent, in a pressure-dependent manner, a connection between the first pump and the primary system-pressure circuit and/or the secondary system-pressure circuit. It can be provided, in particular, that the system pressure valve establishes the connection between the first pump and the primary system-pressure circuit when a first pressure value is exceeded and also establishes the connection to the secondary system-pressure circuit when a higher second pressure value is exceeded.

The second pump is connectable to the primary system-pressure circuit and to the secondary system-pressure circuit via the sailing-mode lubricating valve, wherein the sailing-mode lubricating valve can establish and prevent, in a pressure-dependent manner, a connection between the second pump and the primary system-pressure circuit and/or the secondary system-pressure circuit. It can be provided, in particular, that the sailing-mode lubricating valve establishes the connection between the second pump and the primary system-pressure circuit when a first pressure value is exceeded and also establishes the connection to the secondary system-pressure circuit when a higher second pressure value is exceeded.

The second pump, the primary system-pressure circuit, and the secondary system-pressure circuit are connectable, in particular, to separate ports of the sailing-mode lubricating valve. The sailing-mode lubricating valve can include a piston rod and a housing, wherein the piston rod includes several mutually spaced pistons along its longitudinal axis. The piston rod via its pistons and the housing can form several recesses between themselves, which are radially directed cavities in the housing. The hydraulic fluid conveyed by the second pump can flow into the recesses. Depending on the position of the piston rod, two or more ports of the sailing-mode lubricating valve are connectable to each other via the recesses. In this way, for example, a hydraulic connection can be established between the second pump and the primary system-pressure circuit and/or the secondary system-pressure circuit, and an intended pressure can be set within the corresponding system pressure circuit. The piston rod can be preloaded by a spring, in particular in its longitudinal direction, in order to enable the aforementioned connections to be established in a pressure-dependent manner.

The liquid retention means can be, in particular, a check valve which is preferably arranged, in a connecting line between a pressure outlet of the system pressure valve and an intersection at which the second pump can convey hydraulic fluid into the primary system-pressure circuit, such that hydraulic fluid can be conveyed into the primary system-pressure circuit by the first and the second pumps, but the second pump cannot convey hydraulic fluid into the connecting line and, therefore, through the first pump via the system pressure valve. The check valve can be, for example, a plate valve or a ball valve.

According to one embodiment, it is provided that the sailing-mode lubricating valve includes a housing and a piston rod which is axially preloaded with the aid of a spring and includes at least two pistons, wherein the housing and the piston rod via its pistons form at least two recesses between themselves, and wherein a first recess and a second recess are connected to each other when a first pressure value is exceeded. The recesses can be arranged, in particular, next to each other in the longitudinal direction of the piston rod and can extend radially between the piston rod and the housing. Specifically, the first recess is connectable to the second pump on the inlet side and to the primary system-pressure circuit on the outlet side. The second recess is connectable to the second system-pressure circuit on the outlet side. The spring can preload the piston rod within the housing in such a way that the first and the second recesses are initially not connected to each other, and the second pump conveys hydraulic fluid into the primary system-pressure circuit and sets an intended pressure within the primary system-pressure circuit, but does not convey hydraulic fluid into the secondary system-pressure circuit. As the pressure increases within the first recess, the piston rod is moved axially against a preload force of the spring. If the pressure within the first recess exceeds the first pressure value, the piston rod is displaced axially against the preload force of the spring to such an extent that the first recess and the second recess are now connected to each other. The second pump is now connected to the primary system-pressure circuit via the first recess and to the secondary system-pressure circuit via the first and the second recesses and can convey hydraulic fluid into both system pressure circuits and set intended pressures in both system pressure circuits.

The two pistons can include different sized, opposed, hydraulically active surfaces, wherein the piston rod is axially preloaded with the aid of the spring in the direction of the smaller hydraulically active surface. The hydraulically active surfaces can be, in particular, opposed annular faces of the piston, which have different diameters. Due to the fact that the larger hydraulically active surface is arranged on the side of the spring, a compressive force can be generated by the pressure of the second pump, which counteracts the preload force of the spring. In this way, a pressure control can take place within the sailing-mode lubricating valve by an equilibrium of forces on the piston rod.

According to yet another embodiment, it is provided that the housing and the piston rod via its pistons form at least three recesses between themselves, wherein the first recess and the second recess are connected to each other when a first pressure value is exceeded and a third recess is connected to the first recess and to the second recess when a second pressure value is exceeded.

The three recesses can be arranged, in particular, next to each other in the longitudinal direction of the piston rod and can extend radially between the piston rod and the housing, wherein the first recess is preferably located between the second recess and the third recess, and the second recess faces the spring. Specifically, the first recess is connectable to the second pump on the inlet side and to the primary system-pressure circuit on the outlet side. The second recess is connectable to the second system-pressure circuit on the outlet side. The spring can preload the piston rod within the housing such that the first and the second recesses are initially not connected to each other, and the second pump conveys hydraulic fluid into the primary system-pressure circuit and sets an intended pressure within the primary system-pressure circuit, but does not convey hydraulic fluid into the secondary system-pressure circuit.

As the pressure within the first recess increases, the piston rod is moved axially against a preload force of the spring. If the pressure within the first recess exceeds the first pressure value, the piston rod is displaced axially against the preload force of the spring to such an extent that the first recess and the second recess are now connected to each other. The second pump is now connected to the primary system-pressure circuit via the first recess and to the secondary system-pressure circuit via the first and the second recesses and can convey hydraulic fluid into both system pressure circuits and set intended pressures in both system pressure circuits.

As the pressure within the first recess and the second recess increases, the piston rod is movable further axially against the preload force of the spring. If the pressure within the first recess and the second recess exceeds the second pressure value, the piston rod is displaced axially against the preload force of the spring to such an extent that the first recess is now connected to the second recess and to the third recess. In this way, for example, a connection of the second pump to the primary system-pressure circuit, to the secondary system-pressure circuit, and a preferably non-pressurized reservoir for hydraulic fluid can be established. In this way, unintended high pressures within the primary and the secondary system-pressure circuits are avoidable.

According to yet another embodiment, it is provided that a closed orifice is connected to the third recess, and the second pump is a pressure-controllable pump. According to this embodiment, a system pressure control, i.e., a closed-loop control of the pressure within the primary and the secondary system-pressure circuits, can take place with the aid of a pump regulator, i.e., the pressure-controlled pump can adapt a delivery rate on the basis of characteristic control parameters in order to reach an intended pressure level. The orifice is preferably arranged in a return line which connects the third recess of the sailing-mode lubricating valve to the non-pressurized reservoir for hydraulic fluid, in particular to a non-pressurized oil sump. The closed orifice prevents a pressure limitation with respect to the reservoir from taking place. A limitation of the pressure within the primary and the secondary system-pressure circuits can be ensured by a pump regulator, particularly by reducing the rotational speed of the pump.

Alternatively, it can be provided that an open orifice is connected to the third recess, and the second pump is a volumetric flow rate-controllable pump. According to this embodiment, a system pressure control can take place via the sailing-mode lubricating valve with conventional pressure tolerances. The volumetric flow rate-controllable pump can be, in particular, a pump which is operable at a constant rotational speed. According to this alternative as well, the orifice is preferably arranged in a return line which connects the third recess of the sailing-mode lubricating valve to the non-pressurized reservoir for hydraulic fluid, in particular to the non-pressurized oil sump. By way of the sailing-mode lubricating valve, the shares of the flow of hydraulic fluid conveyed by the second pump into the sailing-mode lubricating valve, which are to be conveyed into the primary and into the secondary system-pressure circuits or which are to be returned into the reservoir via the open orifice, are adjustable. In this way, a limitation of the pressure within the primary and the secondary system-pressure circuits are made possible.

According to yet another embodiment, the hydraulic system can include a system pressure regulator which makes an adjustable output pressure available for the alternative support of an axial preload force of the spring of the sailing-mode lubricating valve. The system pressure regulator can include, for example, a variably adjustable, electric pressure control valve, at which, for example, the pressure prevailing in the primary system-pressure circuit can be present on the inlet side. The output pressure of the system pressure regulator is variably adjustable, for example, with the aid of a variable solenoid.

In conjunction with this embodiment, "alternative" is to be understood to mean that the output pressure can also be adjusted to the value "zero". In this case, the axial preload force of the spring is not supported. In particular, when the second recess connected to the secondary system-pressure circuit is arranged closer to the compression spring than the first recess connected to the second pump and to the primary system-pressure circuit, it is made possible, in this way, that the pressure within the first recess must only exceed the first pressure value in order for the first recess to be connected to the second recess and, therefore, for hydraulic fluid to be conveyed into the secondary system-pressure circuit.

If a particularly high pressure is required and provided in the primary system-pressure circuit, for example, when a clutch fill with higher pressure is required when exiting the sailing mode with a shut-off internal combustion engine or in the start-stop mode, the output pressure of the system pressure regulator can be set sufficiently high for preventing or disconnecting a connection between the first recess and the second recess. In this way, a delivery of hydraulic fluid with the aid of the second pump into the secondary system-pressure circuit can be prevented or stopped. An appropriate volume can then be utilized for filling, for example, a sailing mode-exit clutch, to which pressure is applied with the aid of the primary system-pressure circuit.

The system pressure regulator is advantageously connectable to the primary system-pressure circuit on the inlet side and to the sailing-mode lubricating valve and to a system pressure valve on the outlet side. As represented above, the output pressure can support a preload force of the spring of the sailing-mode lubricating valve as well as an appropriate preload force of a spring of the system pressure valve, in order to act, in a controlling manner, on the delivery of hydraulic fluid with the aid of the first pump into the primary and into the secondary system-pressure circuits.

The sailing-mode lubricating valve can further include an orifice at an outlet which is connected to the secondary system-pressure circuit. The orifice is open and makes a contribution to the limitation of a volumetric flow rate of hydraulic fluid conveyed into the secondary system-pressure circuit with the aid of the second pump.

In yet another embodiment of the invention, a fourth liquid retention means is arranged between said orifice and the secondary system-pressure circuit, which permits a flow from the sailing-mode lubricating valve to the secondary system-pressure circuit, but is closed against a through-flow from the secondary system-pressure circuit toward the sailing-mode lubricating valve. As a result, the output pressure of the system pressure regulator is prevented from increasing in the event of a pressure increase in the secondary system-pressure circuit due to a leakage through the sailing-mode lubricating valve, whereby a spurious influencing of the control behavior of the system pressure valve occurs.

The automatic transmission according to the invention includes an above-described hydraulic system according to the invention. With respect to effects and advantageous embodiments, reference is made to the comments presented above in conjunction with the hydraulic system according to the invention, in order to avoid repetition.

BRIEF DESCRIPTION OF THE DRAWINGS

Exemplary embodiments of the invention are explained in greater detail in the following with reference to the schematic drawing. In the drawings, the following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
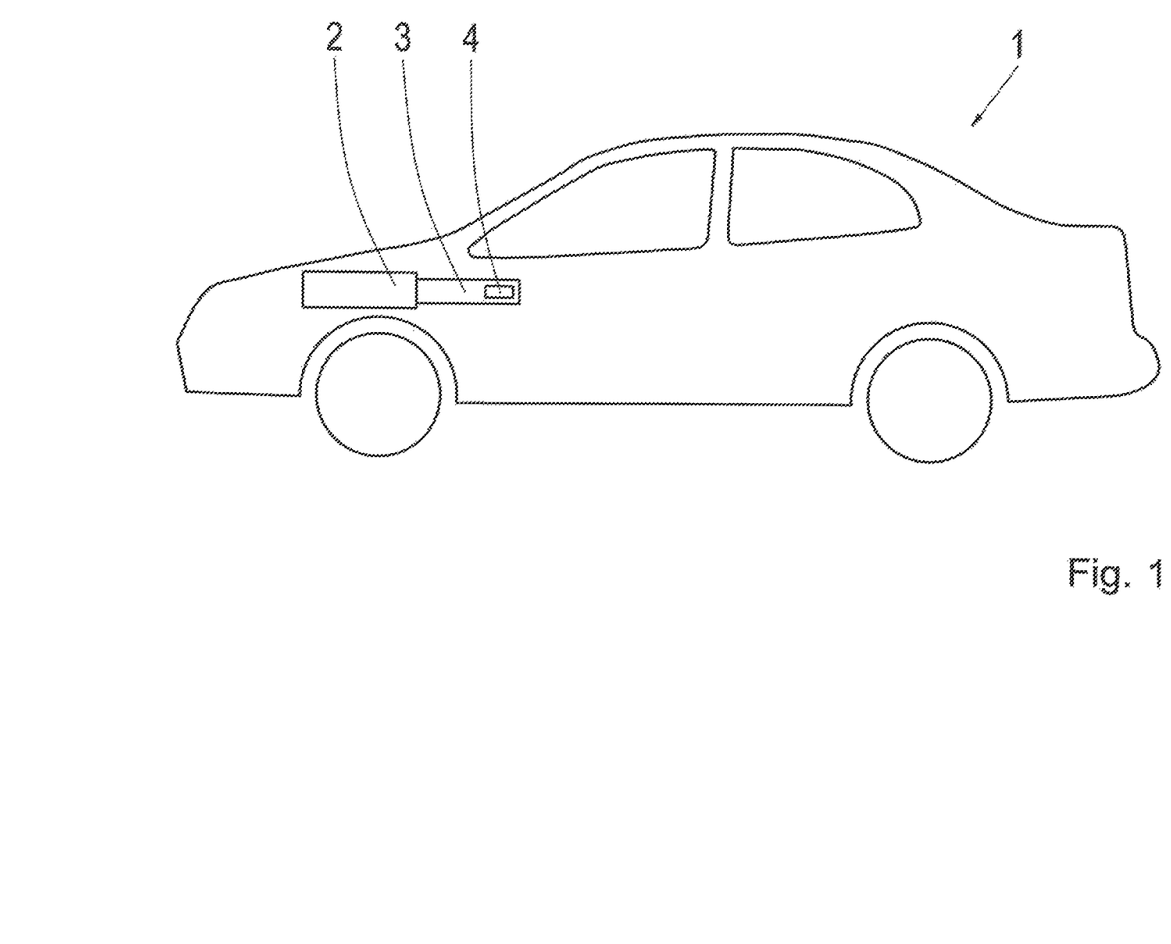
FIG. 1 shows a vehicle including an automatic transmission which includes an exemplary embodiment of a hydraulic system according to the invention.

FIG. 1 shows a motor vehicle 1, specifically a passenger car in the example shown. The motor vehicle 1 includes an internal combustion engine 2 which drives the motor vehicle 1 via an automatic transmission 3 which includes a hydraulic system 4.

Figure 2:
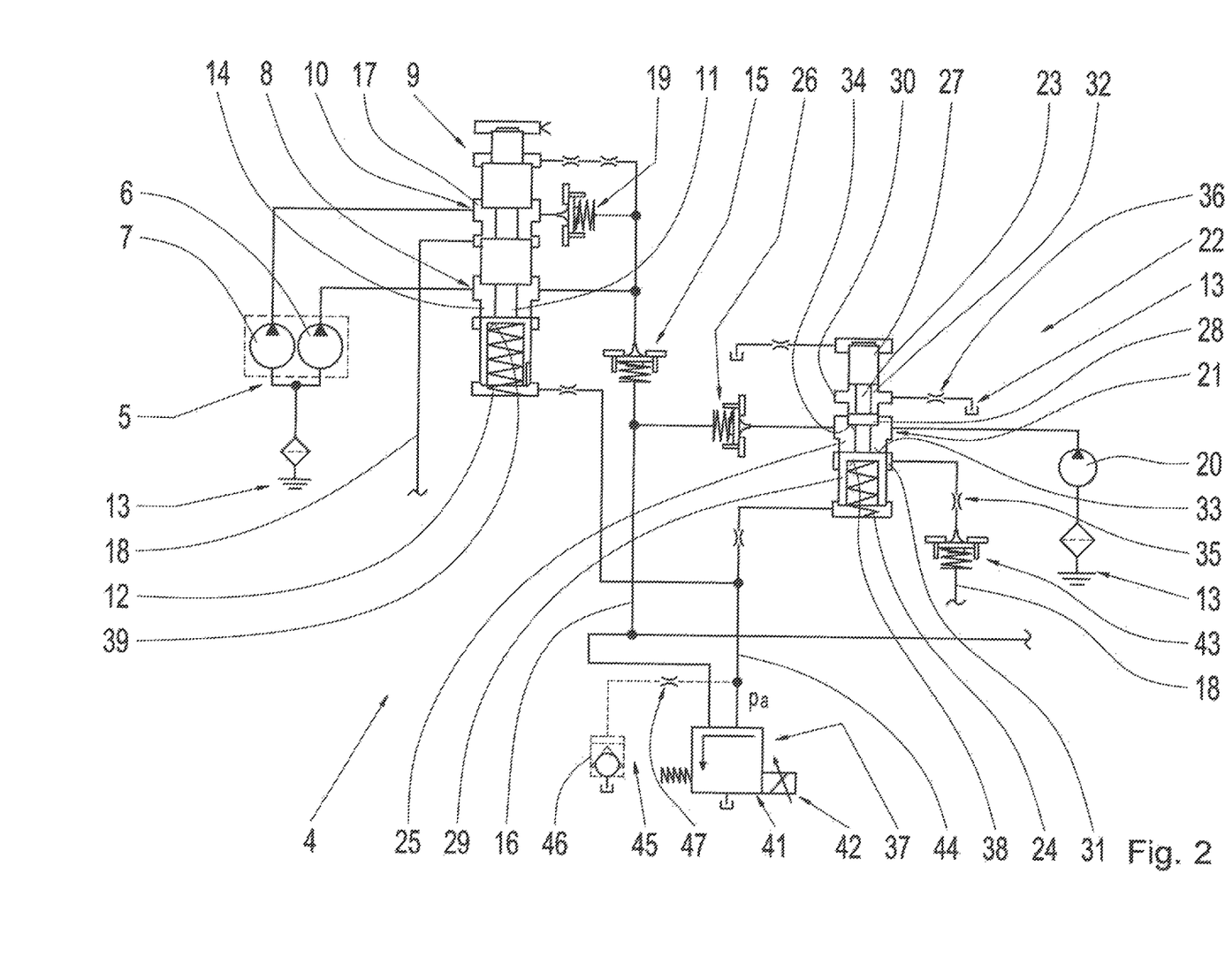
FIG. 2 shows a hydraulic diagram of one part of a hydraulic system for use in the automatic transmission according to FIG. 1.

FIG. 2 shows one part of a circuit diagram of the hydraulic system 4 according to FIG. 1. The hydraulic system 4 includes a first pump 5, specifically a pump system in the example shown, including a primary pump 6 and a secondary pump 7, which is drivable by the internal combustion engine 2 of the motor vehicle 1 (FIG. 1). The primary pump 6 is connected to a first inlet 8 of a system pressure valve 9 and the secondary pump 7 is connected to a second inlet 10 of the system pressure valve 9. The system pressure valve 9 includes a piston rod 11 which is accommodated so as to be axially displaceable within the system pressure valve 9 and is axially preloaded by a spring 12. In the switching position of the system pressure valve 9 shown in FIG. 2, the primary pump 6, provided it is driven by the internal combustion engine 2, can suction hydraulic fluid in the form of oil out of a reservoir for hydraulic fluid in the form of an oil sump 13 and convey the hydraulic fluid via a first recess 14 within the system pressure valve 9 and a first check valve 15 into a primary system-pressure circuit 16 (not represented in further detail), and so an intended pressure is set in the primary system-pressure circuit 16. The secondary pump 7, provided it is driven by the internal combustion engine 2, can suction oil out of the oil sump 13, in the switching position of the system pressure valve 9 shown in FIG. 2, and convey the oil via a second recess 17 within the system pressure valve 9 into a first branch (not represented in further detail) of the secondary system-pressure circuit 18, and so an intended pressure is set in the secondary system-pressure circuit 18. A second check valve 19 prevents oil conveyed by the primary pump 6 from reaching the secondary pump 7 via the second recess 17. All the check valves represented in FIG. 2 are plate valves.

If the internal combustion engine 2 is not driving the primary pump 6 and the secondary pump 7, the oil supply of the primary system-pressure circuit 16 and of the secondary system-pressure circuit 18 can be taken over by a second pump 20, specifically an electrically drivable additional oil pump in this case. The second pump 20 is connected to a first inlet 21 of a sailing-mode lubricating valve 22. The sailing-mode lubricating valve 22 includes a piston rod 23 which is accommodated so as to be axially displaceable within the sailing-mode lubricating valve 22 and is axially preloaded with a preload force by a spring 24. In the switching position of the sailing-mode lubricating valve 22 shown in FIG. 2, the second pump 20, provided it is electrically driven, can suction hydraulic fluid in the form of oil out of the oil sump 13 and convey the oil via a first recess 25 within the sailing-mode lubricating valve 22 and via a third check valve 26 into the primary system-pressure circuit 16, and so an intended pressure is set in the primary system-pressure circuit 16 even when the primary pump 6 does not convey oil into the primary system-pressure circuit 16.

The piston rod 23 includes a first piston 27 which is represented at the top in FIG. 2, a second piston 28 which is represented in the center in FIG. 2, and a pot-shaped third piston 29 which is represented at the bottom in FIG. 2 and within which the spring 24 is guided. The piston rod 23 is axially displaceably accommodated within a housing 30 of the sailing-mode lubricating valve 22, wherein the housing 30 is indicated in FIG. 2 simply by a line. In the switching position of the sailing-mode lubricating valve 22 shown in FIG. 2, the first recess 25 is delimited by the piston rod 23 via its second piston 28 and its third piston 29 as well as an inner wall of the housing 30. In a similar way, in the switching position of the sailing-mode lubricating valve 22 shown in FIG. 2, a second recess 32 is delimited by the piston rod 23 via its first piston 27 and its second piston 28 as well as the inner wall of the housing 30. Furthermore, in a similar way, in the switching position of the sailing-mode lubricating valve 22 shown in FIG. 2, a third recess 31 is delimited by the piston rod 23 via its third piston 29 as well as the inner wall of the housing 30.

As shown in FIG. 2, the spring 24 axially preloads the piston rod 23 in such a way that the three recesses 25, 31 and 32 are not connected to each other. Therefore, oil suctioned out of the oil sump 13 by the second pump 20 is initially conveyed only via the second recess 25 and the third check valve 26 into the primary system-pressure circuit 16. The third check valve 26 prevents oil which has been conveyed into the primary pressure circuit 16 with the aid of the primary pump 6 from being conveyed through the second pump 20 via the sailing-mode lubricating valve 22.

As the pressure within the primary pressure circuit 16 and within the first recess 25 increases, an equilibrium of forces sets in at the piston rod 23, wherein the piston rod 23 is axially displaced against the preload force of the spring 24. This is made possible due to the fact that the third piston 29 forms a larger hydraulically active first annular surface 33 than an opposed, hydraulically active second annular surface 34 of the second piston 28. If the pressure within the first recess 25 exceeds a first limiting value p1, the piston rod 23 via its third piston 29 is displaced against the preload force of the spring 24 and in the direction of the spring 24 to such an extent that the first recess 25 is connected to the third recess 31. The third recess 31 is connected via a first orifice 35 for flow-rate limitation to a second branch of the secondary system-pressure circuit 18. Therefore, oil conveyed from the oil sump 13 by the second pump 20 can be conveyed via the first recess 25 and the third recess 31, in a pressure-dependent manner, into the secondary system-pressure circuit 18 and an intended pressure can be set in the secondary system-pressure circuit 18.

If the pressure in the first recess 25 and in the third recess 31, which are now connected to each other, increases above a second limit value p2 which is higher than the first limit value p1, the piston rod 23, via its second piston 28 and its third piston 29, is displaced against the preload force of the spring 24 and in the direction of the spring 24 to such an extent that the first recess 25 is connected to the third recess 31 and to the second recess 32. The second recess 32 is connected to the oil sump 13 via a second orifice 36.

A pressure-controlled pump is usable as the second pump 20, which adapts a delivery rate on the basis of characteristic control parameters in order to achieve an intended pressure level. The second orifice 36 is closed in this case, and so, when recesses 25, 31 and 32 are connected to each other, in the event of an overpressure, the pressure-controlled second pump 20 limits the pressure within the recesses 25, 31 and 32 and within the primary system-pressure circuit 16 and the secondary system-pressure circuit 18, in particular by reducing the rotational speed of the second pump 20.

Alternatively, a volumetric flow rate-controllable pump is usable as the second pump 20. The second orifice 36 is open in this case, and so a pressure limitation with respect to the oil sump 13 can take place, in that excess oil volume is vented and the pressure within the primary system-pressure circuit 16 and the secondary system-pressure circuit 18 is limited. The volumetric flow rate-controllable pump can be, for example, a pump having a constant rotational speed, wherein the flow conveyed in the primary system-pressure circuit 16 and the secondary system-pressure circuit 18 is adjusted with conventional pressure tolerances via the sailing-mode lubricating valve 22.

The hydraulic system 4 further includes a system pressure regulator 37 which makes an adjustable output pressure $p_a$ available for the alternative support of the axial preload force of the spring 24 of the sailing-mode lubricating valve 22 as well as of the spring 12 of the system pressure valve 9. For this purpose, the system pressure regulator 37 is connected to the primary system-pressure circuit 16 on the inlet side and to the sailing-mode lubricating valve 22 and to a system pressure valve 9 on the outlet side, via a line 44.

The output pressure $p_a$ of the system pressure regulator 37 can act on a hydraulically active, first circular surface 38 of the third piston 29, which is arranged opposite the first annular surface 33 of the pot-shaped third piston 29. In a similar way, the output pressure $p_a$ of the system pressure regulator 37 can also act on a hydraulically active, second circular surface 39 of a pot-shaped piston 40 of the system pressure valve 9. The system pressure regulator 37 includes a variably adjustable, electric pressure control valve 41, to the inlet of which the primary system-pressure circuit 16 is connected. The output pressure $p_a$ of the system pressure regulator 37 is variably adjustable with the aid of a variable solenoid 42. The output pressure $p_a$ is maximal when no current is applied at the variable solenoid 42. The output pressure $p_a$ is minimal when the maximum current is applied at the variable solenoid 42. In this way, the output pressure $p_a$ is variably adjustable. Therefore, a control pressure also acting in the direction of the preload force of the spring 24 or 12, and the opening pressure of the sailing-mode lubricating valve 22 with respect to the secondary system-pressure circuit 18 is variably adjustable.

The output pressure $p_a$ can also be adjusted to the value "zero". In this case, the axial preload force, in particular of the spring 24 of the sailing-mode lubricating valve 22, is not supported. In this way, it is made possible that the pressure within the first recess 25 must only exceed the first pressure value p1 in order for the first recess 25 to be connected to the third recess 31 and, therefore, for oil to also be conveyed into the secondary system-pressure circuit 18. If a particularly high pressure is required and provided in the primary system-pressure circuit 16, for example, when a clutch fill with higher pressure is required when exiting a sailing mode with a shut-off internal combustion engine or in a start-stop mode, the output pressure $p_a$ of the system pressure regulator 37 can be set sufficiently high for preventing or disconnecting a connection between the first recess 25 and the third recess 31. In this way, a delivery of hydraulic fluid with the aid of the second pump into the secondary system-pressure circuit 18 can be prevented or stopped. An appropriate volume can then be utilized for filling, for example, a sailing mode-exit clutch, to which pressure is applied with the aid of the primary system-pressure circuit 16.

The hydraulic system 4 shown in FIG. 2 further makes it possible for the second pump 20 to support the first pump system 5 with respect to the oil supply of the primary system-pressure circuit 16 and the secondary system-pressure circuit 18, in particular in driving situations with undersupply. This functionality can also be utilized for reducing the displacement volume of the first pump system to a minimum. Therefore, energy utilized beyond dynamic switching operations can be reduced, which makes it possible to reduce fuel consumption.

Optionally, a fourth check valve 43 can be arranged between the first orifice 35 and the secondary system-pressure circuit 18, which permits a flow from the sailing-mode lubricating valve 22 to the secondary system-pressure circuit 18 and closes against a through-flow in the opposite direction. As a result, the situation is prevented in which an increase of the pressure in the secondary system-pressure circuit 18 affects the output pressure $p_a$ of the system pressure regulator 37 through the sailing-mode lubricating valve 22. This would be possible due to a leakage from the third recess 31 to the first recess 25 and due to a leakage through the chamber in which the spring 24 is arranged. An influencing of the output pressure $p_a$ would ultimately negatively affect the function of the system pressure valve.

As a further option, a hydraulic capacitance, as a damper unit 45, is connectable to the line 44, which could dampen fluctuations in the output pressure $p_a$ if such fluctuations would occur. The damper unit 45 includes a damping cylinder 46 and a third orifice 47 in this case.

Modifications and variations can be made to the embodiments illustrated or described herein without departing from the scope and spirit of the invention as set forth in the appended claims.

REFERENCE CHARACTERS 1 motor vehicle
2 internal combustion engine
3 automatic transmission
4 hydraulic system
5 pump system
6 primary pump
7 secondary pump
8 first inlet
9 system pressure valve
10 second inlet
11 piston rod
12 spring
13 oil sump
14 first recess of the system pressure valve
15 check valve
16 primary system-pressure circuit
17 second recess of the system pressure valve
18 secondary system-pressure circuit
19 second check valve
20 second pump
21 first inlet
22 sailing-mode lubricating valve
23 piston rod
24 spring
25 first recess
26 third check valve
27 first piston
28 second piston
29 third piston
30 housing
31 third recess
32 second recess
33 first annular surface
34 second annular surface
35 first orifice
36 second orifice
37 system pressure regulator
38 first circular surface
39 second circular surface
40 piston
41 pressure control valve
42 solenoid
43 fourth check valve
44 line
45 damper unit
46 damping cylinder
47 third orifice p_a output pressure

The invention claimed is:

1. A hydraulic system (4) for a transmission (3) of a motor vehicle (1), comprising:
a primary system-pressure circuit (16);
a secondary system-pressure circuit (18);
a first pump (5) drivable by an engine (2) of the motor vehicle (1) and an electrically drivable second pump (20), the first pump (5) and the second pump (20) each being configured for conveying hydraulic fluid into the primary system-pressure circuit (16) and into the secondary system-pressure circuit (18) so that an intended pressure prevails in the primary system-pressure circuit (16) and in the secondary system-pressure circuit (18);
a sailing-mode lubricating valve (22) configured for controlling, by an open-loop system, a flow rate of hydraulic fluid conveyed by the second pump (20) into the primary system-pressure circuit (16) and into the secondary system-pressure circuit (18) such that the intended pressure is set in the primary system-pressure circuit (16) and in the secondary system-pressure circuit (18); and
liquid retention means (15, 26) configured for preventing a flow of hydraulic fluid conveyed by the second pump (20) from being conducted through the first pump (5) when the first pump (5) is not conveying and the second pump (20) is conveying, and for preventing a flow of hydraulic fluid conveyed by the first pump (5) from being conducted through the second pump (20) and the sailing-mode lubricating valve (22) when the second pump (20) is not conveying and the first pump (5) is conveying.

2. The hydraulic system (4) of claim 1, wherein the sailing-mode lubricating valve (22) comprises:
a housing (30);
a spring (24);
a piston rod (23) axially preloaded with the aid of the spring (24); and
at least two pistons (27 to 29),
wherein the housing (30) and the piston rod (23) via the at least two pistons (27 to 29) form at least two recesses (25, 31), and wherein a first recess (25) and a second recess (31) of the at least two recesses are connected when a first pressure value is exceeded.

3. The hydraulic system (4) of claim 2, wherein a second piston (28) of the at least two pistons has a second hydraulically active surface (34) and a third piston (29) of the at least two pistons has a first hydraulically active surface (33), the first hydraulically active surface (33) being of a different size than and being positioned opposed to the second hydraulically active surface (34), wherein the piston rod (23) is axially preloaded by the spring (24) towards the smaller of the first and second hydraulically active surfaces (33, 34).

4. The hydraulic system (4) of claim 2, wherein the at least two recesses further comprises a third recess (32), the third recess (32) being connected to the first recess (25) and to the second recess (31) when a second pressure value is exceeded.

5. The hydraulic system (4) of claim 4, wherein a closed orifice (36) is connected to the third recess (32) and the second pump (20) is a pressure-controllable pump.

6. The hydraulic system (4) of claim 4, wherein an open orifice (36) is connected to the third recess (32) and the second pump (20) is a volumetric flow rate-controllable pump.

7. The hydraulic system (4) of claim 2, further comprising a system pressure regulator (37) which makes an adjustable output pressure ($p_a$) available for the alternative support of an axial preload force of the spring (24) of the sailing-mode lubricating valve (22).

8. The hydraulic system (4) of claim 7, wherein the system pressure regulator (37) is connected to the primary system-pressure circuit (16) on an inlet side and to the sailing-mode lubricating valve (22) and to a system pressure valve (9) on an outlet side.

9. The hydraulic system (4) of claim 1, wherein the sailing-mode lubricating valve (22) comprises an orifice (35) at an outlet which is connected to the secondary system-pressure circuit (18).

10. The hydraulic system (4) of claim 9, further comprising a fourth liquid retention means (43) arranged between the orifice (35) and the secondary system-pressure circuit (18), the fourth liquid retention means (43) permitting a flow from the sailing-mode lubricating valve (22) to the secondary system-pressure circuit (18) and preventing a flow from the secondary system-pressure circuit (18) toward the sailing-mode lubricating valve (22).

11. A transmission (3) for a motor vehicle (1), comprising the hydraulic system (4) of claim 1.

12. The hydraulic system (4) of claim 1, further comprising a system pressure valve (9) configured for controlling, by an open-loop system, a flow rate of hydraulic fluid conveyed by the first pump (5) into the primary system-pressure circuit (16) and into the secondary system-pressure circuit (18) such that the intended pressure is set in the primary system-pressure circuit (16) and in the secondary system-pressure circuit (18).

13. The hydraulic system (4) of claim 12, wherein the liquid retention means (15, 26) is configured for preventing the flow of hydraulic fluid conveyed by the second pump (20) from being conducted through the first pump (5) and the system pressure valve (9) when the first pump (5) is not conveying and the second pump (20) is conveying.

14. A hydraulic system (4) for a transmission (3) of a motor vehicle (1), comprising:
a primary system-pressure circuit (16);
a secondary system-pressure circuit (18);
a first pump (5) drivable by an engine (2) of the motor vehicle (1) and an electrically drivable second pump (20), the first pump (5) and the second pump (20) each being configured for conveying hydraulic fluid into the primary system-pressure circuit (16) and into the secondary system-pressure circuit (18) so that an intended pressure prevails in the primary system-pressure circuit (16) and in the secondary system-pressure circuit (18);
liquid retention means (15, 26) configured for preventing a flow of hydraulic fluid conveyed by the second pump (20) from being conducted through the first pump (5) when the first pump (5) is not conveying and the second pump (20) is conveying, and for preventing a flow of hydraulic fluid conveyed by the first pump (5) from being conducted through the second pump (20) when the second pump (20) is not conveying and the first pump (5) is conveying;
a sailing-mode lubricating valve (22) configured for controlling, by an open-loop system, a flow rate of hydraulic fluid conveyed by the second pump (20) into the primary system-pressure circuit (16) and into the secondary system-pressure circuit (18) such that the intended pressure is set in the primary system-pressure circuit (16) and in the secondary system-pressure circuit (18), the sailing-mode lubricating valve (22) comprising an orifice (35) at an outlet which is connected to the secondary system-pressure circuit (18); and a further liquid retention means (43) arranged between the orifice (35) and the secondary system-pressure circuit (18), the further liquid retention means (43) permitting a flow from the sailing-mode lubricating valve (22) to the secondary system-pressure circuit (18) and preventing a flow from the secondary system-pressure circuit (18) toward the sailing-mode lubricating valve (22).

15. A hydraulic system (4) for a transmission (3) of a motor vehicle (1), comprising:
   a primary system-pressure circuit (16);
   a secondary system-pressure circuit (18);
   a first pump (5) drivable by an engine (2) of the motor vehicle (1) and an electrically drivable second pump (20), the first pump (5) and the second pump (20) each being configured for conveying hydraulic fluid into the primary system-pressure circuit (16) and into the secondary system-pressure circuit (18) so that an intended pressure prevails in the primary system-pressure circuit (16) and in the secondary system-pressure circuit (18);
   liquid retention means (15, 26) configured for preventing a flow of hydraulic fluid conveyed by the second pump (20) from being conducted through the first pump (5) when the first pump (5) is not conveying and the second pump (20) is conveying, and for preventing a flow of hydraulic fluid conveyed by the first pump (5) from being conducted through the second pump (20) when the second pump (20) is not conveying and the first pump (5) is conveying;
   a sailing-mode lubricating valve (22) configured for controlling, by an open-loop system, a flow rate of hydraulic fluid conveyed by the second pump (20) into the primary system-pressure circuit (16) and into the secondary system-pressure circuit (18) such that the intended pressure is set in the primary system-pressure circuit (16) and in the secondary system-pressure circuit (18); and
   a system pressure regulator (37),
   wherein the sailing-mode lubricating valve (22) comprises a housing (30), a spring (24), at least two pistons (27 to 29), and a piston rod (23) axially preloaded with the aid of the spring (24), the housing (30) and the piston rod (23) via the at least two pistons (27 to 29) forming at least a first recess (25) and a second recess (31), the first and second recesses (25, 31) being connectable when a first pressure value is exceeded, and
   wherein the system pressure regulator (37) makes an adjustable output pressure ($p_a$) available for the alternative support of an axial preload force of the spring (24) of the sailing-mode lubricating valve (22).

* * * * *